March 2, 1943.  E. A. ZOUB  2,312,951

SAFETY DEVICE FOR AUTOMOBILES

Filed July 25, 1940  2 Sheets-Sheet 1

Inventor
Erazm A. Zoub

By Semmes, Keegin & Semmes
Attorneys

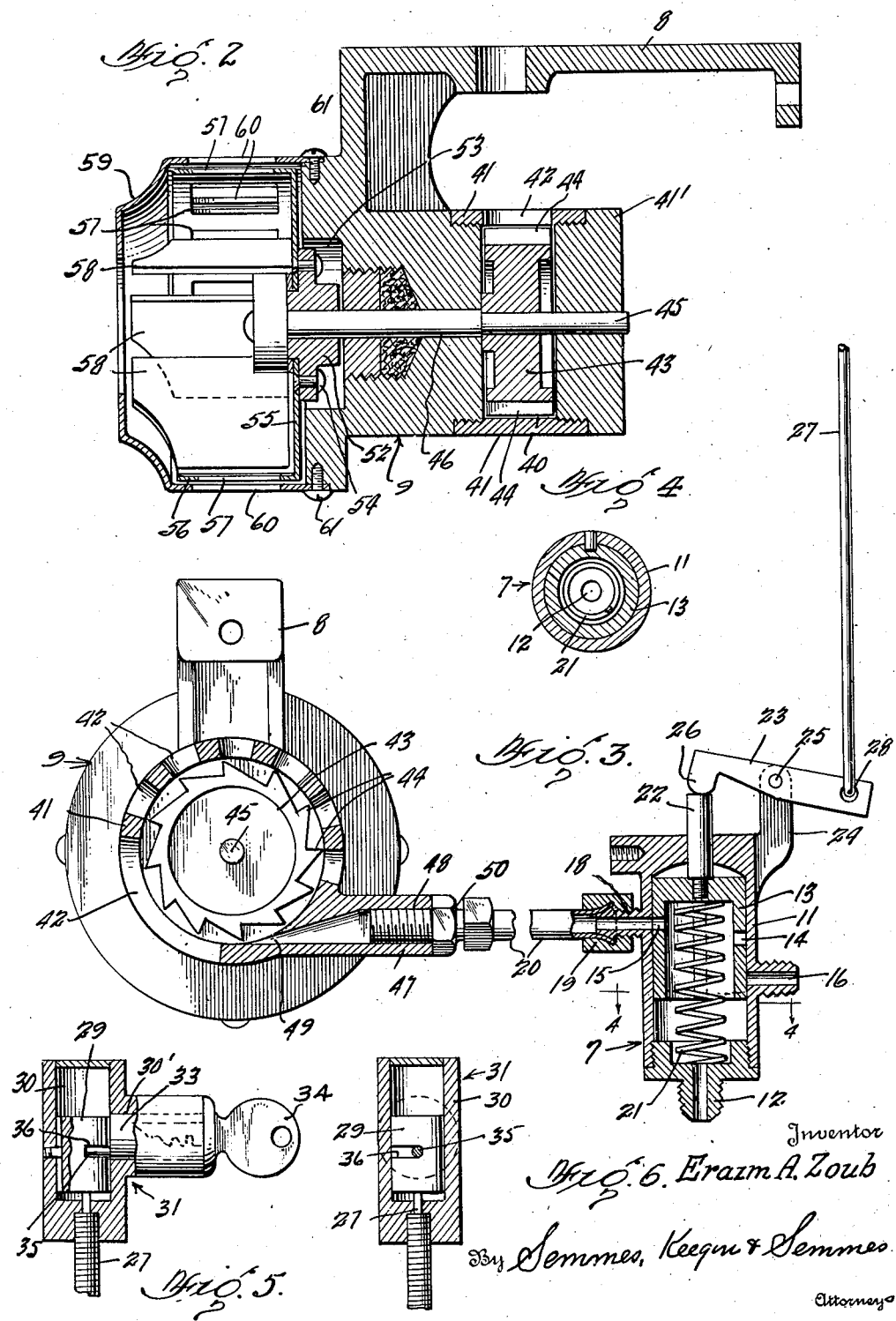

Patented Mar. 2, 1943

2,312,951

UNITED STATES PATENT OFFICE 2,312,951

SAFETY DEVICE FOR AUTOMOBILES

Erazm A. Zoub, New York, N. Y.

Application July 25, 1940, Serial No. 347,539

5 Claims. (Cl. 116—33)

The present invention relates to signal devices for motor vehicles and more particularly to automatically operated alarm devices that will give an audible signal when the vehicle is operated by an unauthorized person.

Numerous devices have heretofore been provided which will give either visual or audible signals when a motor vehicle has been stolen. In addition, several constructions have been proposed in which the signal is adapted to be operated by some portion of the vehicle engine such as the exhaust gases or fluid pressures. However, none of these prior devices makes use of the pressure from the oil pump to operate the signal.

An object of this invention is to provide a signalling device for motor vehicles which is actuated by the oil pump of the power plant.

Another object of this invention is to provide a signal device for a motor vehicle, the primary working parts of which are enclosed in the crank case of the engine thus making it very difficult to render the safety device inoperative.

Yet a further object of this invention is to provide a signal device for motor vehicles which will cause an audible alarm to be operated when the engine is started by an unauthorized person.

And another object of this invention is to provide a signal device for motor vehicles which consists of relatively few essential working parts and which can be cheaply and easily manufactured.

Still another object of this invention is to provide a signal device for motor vehicles with which different types of alarms such as sirens, bells, or the like, can be employed.

To achieve the above and other objects, my invention in general comprises positioning in the crank case of the engine an audible signalling unit which is adapted to be operated by means of pressure from the oil pump. Disposed in the oil line between the oil pump and the main oil feeding line or in a by pass (not shown) from this line is a valve which is adapted, when the engine has been started by an unauthorized person, to force the oil into the safety unit to cause an audible signal to be operated.

There is associated with the valve a member which is adapted to extend to a position within the motor vehicle that can be conveniently reached by the operator of the car. This member is locked by means of a key and when locked, it holds the valve in a position to permit the oil from the pump to be forced into the safety unit, and unless this member is unlocked, the starting of the engine will cause an alarm to be given, indicating that some person other than the owner of the car is operating the vehicle. On the other hand, when the member is unlocked, the valve is moved to a position which will not permit the oil from the pump to go into the safety unit, thus rendering the alarm device inoperative.

In the preferred embodiment of my invention, I have illustrated two types of audible signals that can be used, namely, a siren or a bell, but it is of course obvious that other types of audible alarms can be employed.

In the drawings in which like numerals designate the same or similar parts:

Figure 2 is a longitudinal sectional view of one of my audible alarm devices.

Figure 3 is a transverse sectional view of the turbine of the alarm device and the valve construction for admitting oil flow to the turbine.

Figure 4 is a sectional view taken along the line 4—4 of Figure 3 looking in the direction of the arrows.

Figure 5 is a view in side elevation, partly in section, of the locking unit for the valve.

Figure 6 is a transverse sectional view of the construction shown in Figure 5.

Figure 1:
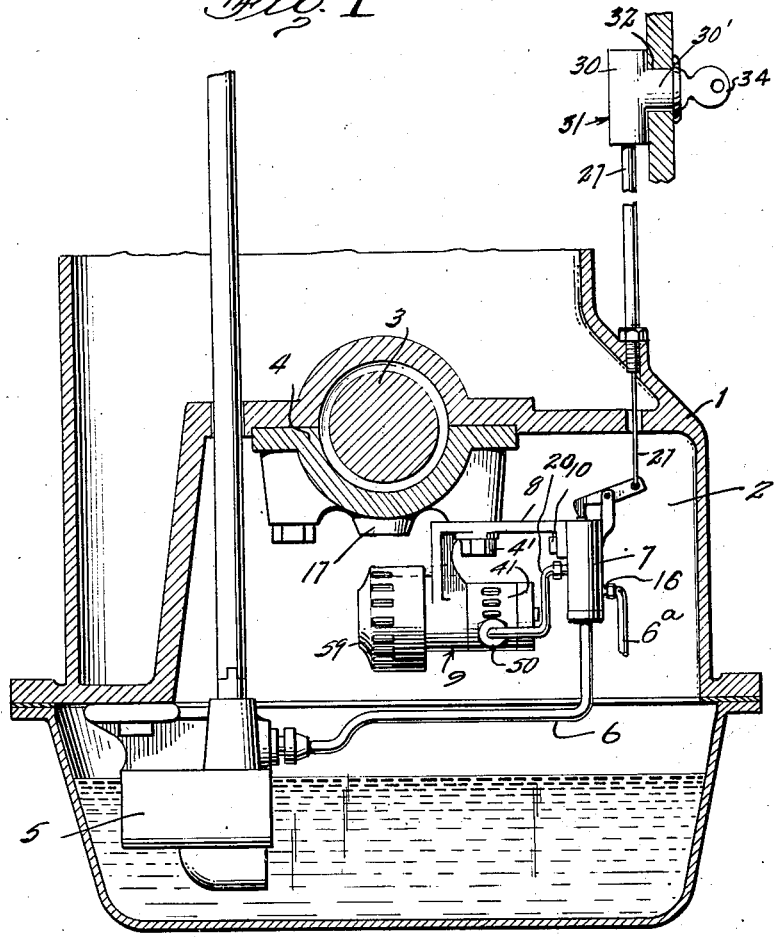
Figure 1 is a transverse sectional view of an engine showing the manner in which my novel safety device is positioned in the crank case of the engine.

Referring now to the drawings and more particularly to Figure 1, I have shown an automobile engine 1, a crank case 2, a crank shaft 3, and main bearings 4. Positioned within the crank case 2 is an oil pump 5 which supplies oil to the system through a feed line 6. Disposed in the feed line 6 is a valve 7 which controls the flow of oil into my novel alarm device 9. The alarm 9 is secured within the crank case 2 by any suitable means such as by an integral bracket 8 through which may pass one of the bearing bolts 4'. The valve 7 may also be attached to this bracket, as at 10. Obviously a separate oil line from the pump 5 to the valve 7 or a by pass in the line 6 or other oil lines within the crank case may be employed to supply the alarm 9.

Referring now to Figure 3, it will be noted that the valve 7 comprises a casing 11 which has a nipple 12 at its lower end to which the feed line 6 is attached. Movable in the casing 11 is a slide valve 13 which has ports 14 and 15. The port 14 is adapted to register with a bore in a nipple 16 which is in communication with the feed pipe 6a for permitting the oil to flow into the system. The other port 15 communicates with a nipple 18 to which is connected, as shown at 19, a line 20 which extends to the safety unit 9.

A helical spring 21 is positioned within the casing 11 and the lower end thereof bears against the fitting 12 and the upper end contacts the slide valve 13. The spring 21 holds the valve in the position shown in Figure 3, or, in other words, maintains the oil pump in communication with the safety device 9.

A rod 22 extends through an opening in the upper wall of the casing 11 and is threaded into valve 13. A lever 23 is pivoted to arms 24 formed on the casing 11 as shown at 25. The end of the lever has a protuberance 26 that is adapted to contact the top of the valve rod 22. A Bowden wire cable 27 is attached to the opposite end of the arm 23, as shown at 28. The upper or free end of the Bowden wire 27 is attached to a plug 29 which is slidable within a closed sleeve 30 which constitutes a portion of a lock 31. As shown in Figures 1 and 5, lock 31 fits in an aperture 32 provided in the dashboard of the motor vehicle. Mounted within a barrel 30' perpendicular to the sleeve 30 is a lock unit 33 which is rotated only by means of a proper key 34. I have not shown specifically the construction of the lock since any suitable assembly can be used. The lock shaft 33 carries an eccentric pin 35 that is adapted to ride in a horizontal slot 36 provided in the plug 29.

When it is desired to set the alarm to operate, the key is moved to the position shown in Figure 5 and the plug 29 is moved to relieve tension on the Bowden wire 27 to permit the valve to assume the position shown in Figure 3, thus keeping the port 15 of the valve 13 in communication with the line 20. On the other hand, when it is desired to drive the vehicle the key 34 is turned to a position where the pin 35, by riding in the slot 36, will move the plug 29 upwardly which in turn will pull the Bowden wire 27 in the same direction and cause the protuberance 26 on the arm 23 to move the valve 13 downwardly against the action of the spring 21, thus moving the port 14 into communication with the nipple 16 and simultaneously moving the port 15 out of register with the line 20. As a consequence, no oil can flow into the alarm device and the vehicle may be operated without giving any audible alarm.

The structural details of the alarm device 9 are best shown in Figures 2 and 3. The device 9 is formed with a turbine chamber 40, formed by a cylinder 41 having exhaust openings 42. The cylinder 41 is threaded onto one end of the casting 9 and is provided with a closure 41'. A turbine rotor 43 having vanes 44 is positioned within the chamber 40 and is attached to a reduced portion 45 of a shaft 46 which is journalled in the casting 9. As shown in Figure 3, the member 41 is provided with a tangential extension 47 having a jet 48 that is reduced inwardly as shown at 49. The oil line 20 is attached to the extension 47 as shown at 50. As will later become more fully apparent, when the valve is in the position shown in Figure 3, and the engine is running, oil will be forced through the port 15 into the line 20 through the jet 48, the restricted jet 49 and into contact with the vanes 44, thus imparting rotary movement to the turbine and causing the shaft 46 to rotate. By virtue of the openings 42 in the ring 41, the oil will exhaust back into the crank case 2.

As shown in Figure 2, a hub 52 is attached to the rod 46 and fits within a recess 53 provided in the casting 9. Attached to the hub 52 as shown at 54 is a blower element 55 having an annular flanged portion 56 formed with openings 57. Suitably attached within the blower element 55 are a plurality of vanes 58. A casing 59 having openings 60 adapted to register with the openings 57 is positioned around the blower 55 and is attached to the casting 9 as shown at 61. It is believed readily apparent therefore that when the blower 55 is rotated the movement of the apertures and vanes of this member with respect to the openings 60 of the casing 59 will cause an audible signal to be given.

In operation, when the operator of the car has removed the key 34 from the lock, the valve 13 is in the position shown in Figure 3—that is, the oil line from the pump 5 is in communication with the turbine 43 of the alarm 9. If an unauthorized person should start the engine with the alarm in the position shown, oil from the pump will be forced into the turbine, thus imparting rotary movement to the shaft 46 which at the same time will cause the blower 55 and its associated parts to be rotated, thereby giving an audible signal which indicates that someone other than the owner of the car is attempting to operate it.

Clearly, I have provided an alarm device for motor vehicles which is highly effective and which is quite simple in construction and operation. By having the primary parts of the alarm mounted within the crank case of the engine, it is practically impossible for a person to render the alarm inoperable without dismantling considerably the vehicle. If the external connections to the valve 7 should be broken, the device will nevertheless still remain operable since the spring 21 will cause the valve to remain in the position which maintains the oil pump 5 in communication with the turbine.

Figure 7:
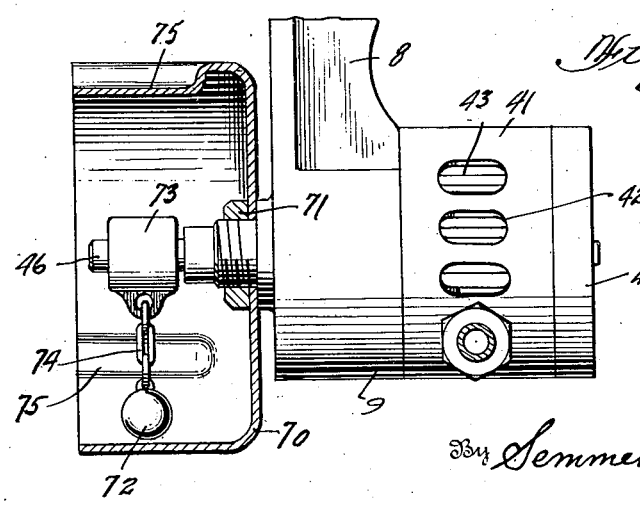
Figure 7 is a longitudinal view, partly in section, of a modified form of audible alarms.

In Figure 7, I have shown my inventive concept used in connection with another type of audible alarm. In this embodiment it can be seen that a metal bell 70 is suitably attached as at 71 to the turbine casting 9. A bell clapper 72 is attached to a collar 73 which is affixed to the shaft 46, by a chain 74. The bell 70 is provided with a plurality of internally depressed portions 75. When the shaft 46 is rotated, the clapper 72 will strike the portions 75, thereby giving a loud audible signal.

While I have disclosed but the two types of audible signals that can be used, it will, of course, be obvious that numerous alarms can be used in conjunction therewith. This invention, by making use of the oil pump of the engine and by being mounted within the crank case, provides an alarm device which is most difficult to tamper with and which is more practical than those which were actuated by other parts of the engine, such as the exhaust manifold. In addition, even though the locking device which operates the valve construction 7 is broken or otherwise damaged, the element is not rendered ineffective because means are provided to keep the turbine in communication with the oil pump.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. In a signal device for a motor vehicle adapted to be used in connection with the oil pump of an internal combustion engine, an audible alarm operated by the pressure of the oil in the oil pump mounted within the crank case, valve means disposed in the oil line for connecting the alarm with the pump whereby an alarm is given when the engine is started, and hand operated means within the vehicle to actuate said valve means to prevent communication between the pump and the alarm.

2. In a signal device for a motor vehicle adapted to be used in connection with the oil pump of the engine, an audible alarm operated by the pressure of the oil in the oil pump mounted within the crank case, valve means in the oil line to connect the oil pump with the alarm whereby an alarm will be given when the engine is started, and manually operated means in the vehicle to actuate the valve to prevent or allow flow of fluid pressure to the alarm when the legal operator is operating the vehicle.

3. An audible alarm for use in a motor vehicle adapted to be used in conjunction with the oil pump of an engine, said alarm comprising an alarm device mounted within the crank case and operated by pressure of the oil in the oil pump, a feed line extending from the pump to the alarm, a valve interposed in the line for controlling the flow of oil from the oil pump, said valve normally maintaining the pump and alarm in communication and manually operated means within the vehicle to move the valve to a position whereby communication between the pump and the alarm is cut off.

4. An audible alarm for use in a motor vehicle adapted to be used in conjunction with the oil pump of an engine, said alarm comprising an alarm device mounted within the crank case and operated by pressure of the oil in the oil pump, a feed line extending from the pump to the alarm, a valve interposed in the line for controlling the flow of oil from the oil pump to the alarm, said valve normally maintaining the pump and alarm in communication and manually operated means within the vehicle to move the valve, said means being remotely located from the valve and serving to prevent or allow flow of fluid pressure to the alarm when the legal operator is operating the vehicle.

5. An audible signal for use in a motor vehicle adapted to be used in connection with the oil pump of an engine, said signal comprising a turbine mounted within the crank case, an alarm connected to the turbine whereby rotation thereof will cause the alarm to be actuated, means connecting the oil pump with the turbine, a valve interposed in said connecting means to control the flow of oil through the turbine, and manually operated means within the vehicle to actuate said valve.

ERAZM A. ZOUB.